(12) United States Patent
Rao et al.

(10) Patent No.: US 11,647,063 B2
(45) Date of Patent: May 9, 2023

(54) METHOD AND APPARATUS FOR PRESENTATION OF VIDEO CONTENT

(71) Applicant: ARRIS Enterprises LLC, Suwanee, GA (US)

(72) Inventors: Rajesh Kechal Rao, San Marcos, CA (US); Kaliraj Kalaichelvan, San Diego, CA (US); William P. Franks, San Diego, CA (US); Beena Devadathan, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/470,326

(22) Filed: Sep. 9, 2021

(65) Prior Publication Data

US 2022/0141277 A1 May 5, 2022

Related U.S. Application Data

(60) Provisional application No. 63/109,532, filed on Nov. 4, 2020.

(51) Int. Cl.
*H04L 65/70* (2022.01)
*H04N 21/6587* (2011.01)
*H04L 65/75* (2022.01)

(52) U.S. Cl.
CPC .............. *H04L 65/70* (2022.05); *H04L 65/75* (2022.05); *H04N 21/6587* (2013.01)

(58) Field of Classification Search
CPC ...... H04L 65/70; H04L 65/75; H04N 21/6587
See application file for complete search history.

(56) References Cited

U.S. PATENT DOCUMENTS

| 8,407,747 B1 * | 3/2013 | Inskip ................ H04N 21/2393 725/90 |
| 2010/0135636 A1 | 6/2010 | Zhang et al. |

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated Dec. 24, 2021, by the International Application Division Korean Intellectual Property Office in corresponding International Application No. PCT/US2021/049612. (9 pages).

*Primary Examiner* — Glenton B Burgess
*Assistant Examiner* — Jihad K Boustany
(74) *Attorney, Agent, or Firm* — Panitch Schwarze Belisario & Nadel LLC (57) ABSTRACT

The disclosure relates to a methods and apparatus to perform improved trickplay for higher speeds and high-latency networks. In one aspect, the method comprises receiving, in a processor, data comprising a video or audiovisual signal formatted in a sequence of chunks downloaded sequentially over a communications medium. When the processor receives a command to display the data at a trickplay speed that is higher than normal speed, the processor can begin to skip a number of chunks before downloading a next chunk in the sequence of chunks, decoding, and displaying the decoded chunk. The number of skipped chunks between each downloaded chunk may be a preset number and/or may be dynamically determined in the event that a downloaded chunk is skipped because it is not downloaded in time or if the expected download time of the next chunk is longer than the display time of the current chunk.

15 Claims, 7 Drawing Sheets

(56) References Cited

U.S. PATENT DOCUMENTS

| | | |
|---|---|---|
| 2012/0079000 A1 | 3/2012 | Calcev et al. |
| 2013/0110980 A1 | 5/2013 | Benn et al. |
| 2014/0337904 A1* | 11/2014 | Panje ............... H04N 21/26258 725/90 |
| 2014/0380376 A1 | 12/2014 | Schmidt et al. |
| 2017/0085953 A1* | 3/2017 | Pruden ............. H04N 21/47217 |
| 2020/0145701 A1* | 5/2020 | Liu .................... H04N 21/2402 |

* cited by examiner

METHOD AND APPARATUS FOR PRESENTATION OF VIDEO CONTENT

BACKGROUND

Technical Field

The disclosure relates to a method and apparatus to perform improved trickplay for higher speeds and high-latency networks.

Description of the Related Art

Cable service providers, which are also referred to as Multiple System Operators (MSO), or any communication or content distribution business that operates through a cable network, renders its services to its subscribers. The services can include, but are not limited to, different subscription plans for broadband Internet access, live television, movies, visual media, and telephony. In order to consume these services, subscribers connect to a private network owned (or co-owned or rented) by the broadband cable operator which is implemented according to the Data Over Cable Service Interface Specification (DOCSIS) standard.

A popular method of presenting content delivered over the Internet is HTTP Live Streaming (HLS), described in RFC8216 (published at tools.ietf.org/html/rfc8216 (August 2017) and incorporated herein in its entirety for all purposes). HLS is an HTTP-based adaptive bitrate streaming communications protocol released in 2009. Support for the protocol is widespread in media players, web browsers, mobile devices, and streaming media servers.

HTTP Live Streaming provides a reliable, cost-effective means of delivering continuous and long-form video over the Internet. It allows a receiver to adapt the bit rate of the media to the current network conditions in order to maintain uninterrupted playback at the best possible quality. It supports interstitial content boundaries. It provides a flexible framework for media encryption. It can efficiently offer multiple renditions of the same content, such as audio translations. It offers compatibility with large-scale HTTP caching infrastructure to support delivery to large audiences.

Dynamic Adaptive Streaming over HTTP (DASH), also known as MPEG-DASH, is an adaptive bitrate streaming technique that enables high quality streaming of media content over the Internet delivered from conventional HTTP web servers. Similar to Apple's HTTP Live Streaming (HLS) solution, MPEG-DASH works by breaking the content into a sequence of small HTTP-based file chunks, each chunk containing a short interval of playback time of content that is potentially many hours in duration, such as a movie or the live broadcast of a sports event. The content is made available at a variety of different bit rates, i.e., alternative segments encoded at different bit rates covering aligned short intervals of playback time. While the content is being played back by an MPEG-DASH client, the client uses bit rate adaptation (ABR) to automatically select the segment with the highest bit rate possible that can be downloaded in time for playback without causing stalls or re-buffering events in the playback. Thus, an MPEG-DASH client can seamlessly adapt to changing network conditions and provide high quality playback with fewer stalls or re-buffering events.

Often, for example, when a user is watching over-the-top (OTT) content, for example, delivery of film and/or TV content via the Internet, the user may wish to fast-forward or rewind (reverse play) to a specific time location in the content. Currently, trickplay modes provide options to fast-forward or rewind approximately to a specific time at incrementally faster speeds, for example, 2×, 4×, 16×, etc. It can be helpful to display content during trickplay so that a user can visualize the content at a time location during trickplay. However, if there is latency in the network delivering the content or download speeds are inadequate to keep up with trickplay speeds, the display of content during trickplay can become choppy.

There is a need in the art for methods and systems that can present smoother video during trickplay operations.

SUMMARY

Disclosed herein is a method for displaying video or audiovisual data at an increased speed. The disclosure relates to a method and apparatus to perform improved trickplay for higher speeds and high-latency networks. In one aspect, the method comprises receiving, in a processor, data comprising a video or audiovisual signal formatted in a sequence of chunks downloaded sequentially over a communications medium. When the processor receives a command to display the data at a trickplay speed that is higher than normal speed, the processor can begin to skip a number of chunks before downloading a next chunk in the sequence of chunks, decoding, and displaying the decoded chunk. The number of skipped chunks between each downloaded chunk may be a preset number and/or may be dynamically determined in the event that a downloaded chunk is skipped because it is not downloaded in time or if the expected download time of the next chunk is longer than the display time of the current chunk.

The method can improve the efficiency of devices, such as set-top-boxes, streaming sticks, smart TV's and the like by predicting when a downloaded chunk will be skipped and preemptively skipping the download of that chunk. Network connections are thereby more efficiently used. In addition, by providing for improvements in timely download of the chunks that are not skipped, the user may experience a smoother display of video data during trickplay operations such as fast-forward and rewind.

In one aspect, the method comprises: a) receiving, in a processor, data comprising a video or audiovisual signal formatted in a sequence of chunks, each chunk associated with a sequence number and/or presentation time stamp, wherein the chunks are downloaded sequentially over a communications medium by the processor in communication with a communications interface; b) receiving, in the processor, a command to display the data at a trickplay speed that is higher than normal speed; c) skipping, by the processor, a SkipFactor number of skipped chunks that are next in the sequence; d) downloading, by the processor, a next chunk in the sequence of chunks following the skipped chunks; e) decoding, by the processor, the downloaded chunk; f) displaying, on a display device, the decoded chunk at the trickplay speed; and g) repeating, by the processor, steps c)-f) until receiving, in the processor, a command to stop displaying the data at a trickplay speed.

In another aspect, the method further comprises: d.1) determining, in the processor, if the downloaded chunk is ready for decoding by the time that its presentation time stamp corresponds to the current time at the trickplay speed; and d.2) if the downloaded chunk is not ready for decoding by the time that its presentation time stamp corresponds to the current time at the trickplay speed, then increasing, by the processor, the value of the SkipFactor.

In another aspect, the method further comprises: c.1) determining, in the processor, the SkipFactor by comparing the duration of display of a chunk at the trickplay speed to an expected download time; wherein if the expected download time exceeds the duration of display of a chunk at the trickplay speed, then setting, by the processor, the value of the SkipFactor such that when a next sequential downloaded chunk is expected to be downloaded and available to the processor for decoding, that next chunk will have a presentation time stamp at least equal to a progression of time at the trickplay speed; and c.2) skipping, by the processor, a SkipFactor number of skipped chunks that are next in the sequence. Alternatively, the difference in presentation time stamp values of chunks may be compared to an expected download time and a SkipFactor chosen such that at the conclusion of a download time the difference in presentation time stamp values of chunks that are downloaded will correspond to the progression of presentation time at the trickplay speed.

In another aspect, the method further comprises: selecting, in the processor, reduced bitrate chunks for downloading while the data is displayed at a trickplay speed that is higher than normal speed. Download of reduced bitrate chunks can be combined with the foregoing methods of skipping a SkipFactor number of chunks to keep SkipFactor within a desired range, or below a set limit.

Thus, in some of the above embodiments, if SkipFactor is increased above a preselected threshold, the method may further comprise resetting, in the processor, the SkipFactor to a value at or below the preselected threshold, and selecting, in the processor, reduced bitrate chunks for downloading during all or part of the trickplay operation.

In another aspect, an apparatus according to the disclosure can comprise a processor configured to receive data downloaded through a communications interface over a communications medium by a processor in communication with a communications interface, wherein the data comprises a video or audiovisual signal formatted in a sequence of chunks, each chunk associated with a sequence number and/or presentation time stamp, and wherein the chunks are downloaded sequentially into the processor; an input/output interface configured to receive a command from an input device to display the data at a trickplay speed that is higher than normal speed and to communicate commands to the processor, a display interface in communication with the processor and configured to output a video signal from the processor to a display device, the processor is further configured to, after receiving a command from an input device to display the data at a trickplay speed that is higher than normal speed: a) skip a SkipFactor number of skipped chunks that are next in the sequence; b) download a next chunk in the sequence of chunks following the skipped chunks; c) decode the downloaded chunk; d) output the decoded chunk through the display interface at the trickplay speed; and e) to repeat functions a)-d) until receiving a command to stop displaying the data at a trickplay speed.

In another aspect, the processor can be further configured to increase the value of the SkipFactor if a downloaded chunk is not ready for decoding by the time that its presentation time stamp corresponds to the current time at the trickplay speed.

In another aspect, the processor can be further configured to set the value of the SkipFactor such that when a next downloaded chunk is expected to be available to the processor for decoding based on an expected download time, that next chunk will have a presentation time stamp at least equal to a progression of time at the trickplay speed.

In another aspect, the processor can be further configured to select reduced bitrate chunks for downloading while the data is displayed at a trickplay speed that is higher than normal speed.

In another aspect, the processor can be further configured to, if SkipFactor is increased above a preselected threshold, then reset SkipFactor to a value at or below the preselected threshold, and select reduced bitrate chunks for downloading while the data is displayed at a trickplay speed that is higher than normal speed.

In another aspect, a non-transitory computer readable medium can have instructions operable to cause one or more processors to perform operations comprising: a) receiving, in a processor, data comprising a video or audiovisual signal formatted in a sequence of chunks, each chunk associated with a sequence number and/or presentation time stamp, wherein the chunks are downloaded sequentially over a communications medium by the processor in communication with a communications interface; b) receiving, in the processor, a command to display the data at a trickplay speed that is higher than normal speed; c) skipping, by the processor, a SkipFactor number of skipped chunks that are next in the sequence; d) downloading, by the processor, a next chunk in the sequence of chunks following the skipped chunks; e) decoding, by the processor, the downloaded chunk; f) displaying, on a display device, the decoded chunk at the trickplay speed; g) repeating, by the processor, steps c)-f) until receiving, in the processor, a command to stop displaying the data at a trickplay speed.

In another aspect, a non-transitory computer readable medium can have instructions operable to cause one or more processors to perform operations further comprising: d.1) determining, in the processor, if the downloaded chunk is ready for decoding by the time that its presentation time stamp corresponds to the current time at the trickplay speed; and d.2) if the downloaded chunk is not ready for decoding by the time that its presentation time stamp corresponds to the current time at the trickplay speed, then increasing, by the processor, the value of the SkipFactor.

In another aspect, a non-transitory computer readable medium can have instructions operable to cause one or more processors to perform operations further comprising: c.1) determining, in the processor, the SkipFactor by comparing the duration of display of a chunk at the trickplay speed to an expected download time, wherein if the expected download time exceeds the duration of display of a chunk at the trickplay speed, then setting, by the processor, the value of the SkipFactor such that when a next sequential downloaded chunk is expected to be downloaded and available to the processor for decoding, that next chunk will have a presentation time stamp at least equal to a progression of time at the trickplay speed; and c.2) skipping, by the processor, a SkipFactor number of skipped chunks that are next in the sequence.

In another aspect, a non-transitory computer readable medium can have instructions operable to cause one or more processors to perform operations further comprising: selecting, in the processor, reduced bitrate chunks for downloading while the data is displayed at a trickplay speed that is higher than normal speed.

In another aspect, a non-transitory computer readable medium can have instructions operable to cause one or more processors to perform operations further comprising: if SkipFactor is increased above a preselected threshold, then resetting, in the processor, SkipFactor to a value at or below the preselected threshold, and selecting, in the processor, reduced bitrate chunks for downloading while the data is displayed at a trickplay speed that is higher than normal speed.

BRIEF DESCRIPTION OF THE DRAWINGS

The scope of the present disclosure is best understood from the following detailed description of exemplary embodiments when read in conjunction with the accompanying drawings. Included in the drawings are the following figures.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Presentation of A/V Content with Smooth Trickplay Operations

Figure 1:
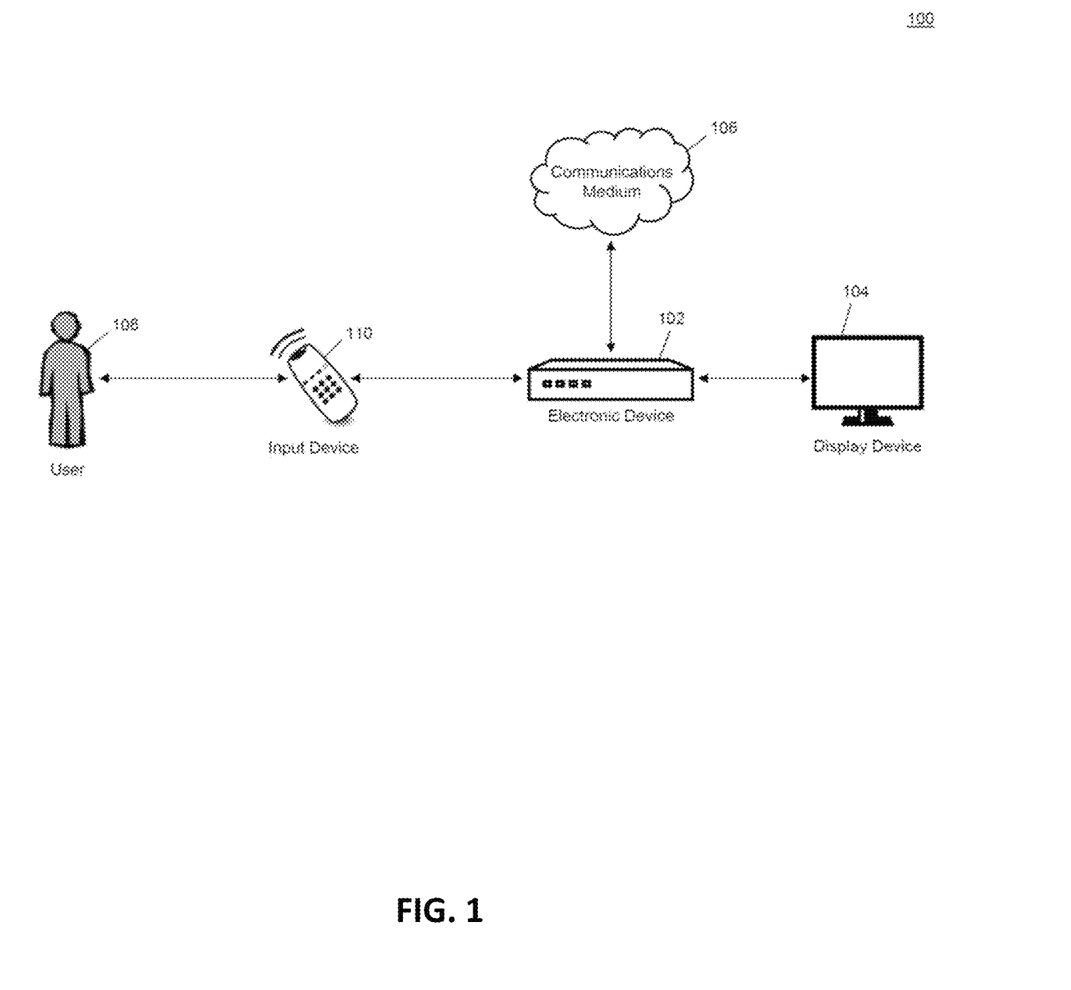
FIG. 1 is a block diagram illustrating a high level system architecture for providing presentation of audiovisual (A/V) content with smooth trickplay operations.

FIG. 1 illustrates an exemplary system 100 for the presentation of audiovisual (A/V) content in accordance with exemplary embodiments. The system 100 may include an electronic device 102. The electronic device 102, discussed in more detail below, may be a computing device configured to receive source signals that are superimposed or otherwise encoded with a video signal and accompanying audio signal for playback. For instance, the electronic device 102 may be a television, smart television, set-top box, receiver, desktop computer, laptop computer, notebook computer, tablet computer, cellular phone, smart phone, smart watch, etc. In some instances, the electronic device 102 may be interfaced with a display device 104 or other device that may display the video signal by the electronic device 102; or may display the video signal and play back the audio signal. For instance, the electronic device 102 may be a set-top box connected to the display device 104, where the display device 104 may display the video signal as received and instructed by the electronic device 102. The electronic device 102 and display device 104 may be interfaced through any suitable type of interface, such as coaxial cable, fiber optic cable, infrared transmission, a local area network, radio frequency, Bluetooth, etc. The electronic device 102 and display device 104 may be housed within a unitary housing, such as a television set, and hard wired and/or integrated together.

The electronic device 102 may receive a source signal that is electronically transmitted via a communications medium 106, such as over-the-air (e.g., via wi-fi, Bluetooth, or other suitable wireless communication medium), over a cable connection (e.g., via Ethernet cable, coaxial cable, fiber optic, or other suitable physical cable), via satellite, and/or other suitable communications medium. For example, the communications medium 106 may be a local area network, cellular communication network, or the Internet where the source signal may be streamed to the electronic device 102 using the communications medium 106. In some instances, the source signal may be received from media inserted into one or more suitable input devices of the electronic device 102 or a remote device connected to the electronic device 102 via a network. For example, the source signal may be read from a digital video disc (DVD), a Blu-ray disc, a thumb drive, or other storage media.

A source signal for presenting A/V content may be encoded as a sequence of chunks, each chunk being associated with a time code defining the time position of the chunk within the content or relative to the start of the first chunk of the content. Each chunk may include one more of audio, video, and other components of the content such as subtitles and captions that may accompany a video signal for display on a display device 104.

The electronic device 102 may receive the source signal and may display the video and audio signal on the interfaced display device 104. At some point during the display of the video and audio signal, a user 108 of the electronic device 102 may desire to replay the video from a certain point. In accordance with an embodiment, the user can give a command on an input device 110, for example, by pressing a pre-defined key or keys on the input device 110 to initiate a trickplay procedure, or may give a voice command. For example, the electronic device 102 can have a library of voice commands and upon receipt of one of the voice commands, the electronic device 102 can implement the method as disclosed herein. Alternatively, for example, a user or consumer can program the input device 110 and/or electronic device 102 with verbal or oral commands selected by the user or consumer to initiate the replay, playback, or fast-forward of video content as described herein including the presentation of the one or more video frames or thumbnail images.

In accordance with an aspect, the input device 110 may be a remote control, mobile computing device (e.g., a tablet computer, cellular phone, smart phone, etc.), camera, microphone, or other suitable input device that may be interfaced with the electronic device 102 to provide user accessibility and input of user instructions.

The electronic device 102 may be configured to present A/V content by downloading chunks of content sequentially by a chunk downloader component, decoding the chunks by a video decoder component, and displaying the content on display device 104. In response to a user command, the electronic device 102 may be configured to execute a trickplay operation using one or more of the methods described herein.

For example, HLS format streaming media assets often include special I-frame-only media segments (chunks) to facilitate DVR-like fast-forward and rewind operations at some multiple of regular play speed, together termed "trickplay". During trickplay operations these special chunks must be downloaded by a part of the player (e.g., the electronic device 102, or software comprised within electronic device 102) specially tasked with this job (ChunkDownloader) and played back serially either forward or in reverse, depending on the direction of trickplay and at a selected speed (e.g., 2×, 4×, 8×, 16×, etc.). In embodiments, each media segment is associated with a sequence number (SeqNum) identifying its place in the overall sequence of chunks described in the playlist. The HLS player is expected to download them serially one after the other in order to present to the user a DVR-like trickplay experience, e.g., playing content forward at increased speed, in reverse, scrubbing, or scrolling (for example, in association with selecting a time position within video content on a time bar).

Each I-frame contains a presentation time stamp (PTS). Each I-frame is rendered on screen, while the succeeding I-frame is decoded, but not presented on screen, awaiting its turn until its PTS becomes current and therefore time for it to be displayed to screen. Thus the difference in PTS between any two successive I-frames defines a period of time for which the first of the pair of I-frames is to be left on screen that can be termed the "hold time".

As speed of trickplay increases, the hold time of each I-frame decreases if no I-Frames are skipped. On some networks, especially those that are geographically widely dispersed, high network latencies may be unavoidable. In such situations, and especially at higher speeds it is possible for the time to download an individual I-frame chunk to become significantly large in relation to the average hold time. Left uncorrected this can result in the I-frames being "outdated" and either having to be skipped over, or if presented, being left on screen for less than the hold time, resulting in a less-than-smooth trickplay experience to the user.

In some embodiments, a system can be configured to attempt to skip over some of the I-frames in the sequence at higher trickplay speeds, so that I-frames always arrive in time, thus directly improving the quality of the trickplay experience. In some embodiments, "skipped" I-frames are not downloaded, thus saving on their download time as well as other processing times.

Method 1: In one aspect, a system and method may apply a configurable factor such that at predetermined trickplay speeds, the player applies a "SkipFactor". In some embodiments, for SkipFactor=N, after each I-frame selected for download, N succeeding I-frames are skipped. SkipFactor=0 implies that no I-frames are skipped. SkipFactor=1 means that only every other I-frame is downloaded.

Method 2: In another aspect, a system and method can be configured such that the Video Decoder notifies the Chunk Downloader when it skips over an I-frame because its PTS was outdated. In some embodiments, for each such notification, ChunkDownloader increases SkipFactor. In other embodiments, SkipFactor can be increased after a set threshold number of I-frames are skipped by the Video Decoder.

Method 3: In another aspect, a system and method can be configured such that as each I-frame is decoded, the Video Decoder notifies the ChunkDownloader of each I-frame rendered to the screen together with its PTS value. In some embodiments, the ChunkDownloader can be configured to use the difference between the PTS values of each pair of successively rendered I-frames to calculate a hold time for each I-frame. In some embodiments, the hold time may then be compared to the measured download time for an I-frame chunk. If the currently measured download time for an I-frame exceeds the hold time, SkipFactor can be increased. In other embodiments, SkipFactor can be increased if a download time for an I-frame exceeds a threshold value that is a set fraction or percentage of the hold time, or if a download time for an I-frame is within a set margin of the hold time. In some embodiments, SkipFactor can be increased only when the aforementioned conditions for increasing SkipFactor occur more than a threshold number of times. In some embodiments, a counter of the number of times that the aforementioned conditions occur can be reset after each time that SkipFactor is increased. In some embodiments, if SkipFactor has previously been increased, SkipFactor can be decreased if a download time for an I-frame is measured to be below a threshold value that is a set fraction or percentage of the hold time, or if a download time for an I-frame is below a set margin of the hold time. In some embodiments, SkipFactor can be decreased only when the aforementioned conditions for decreasing SkipFactor occur more than a threshold number of times. In some embodiments, a counter of the number of times that the aforementioned conditions for decreasing SkipFactor occur can be reset after each time that SkipFactor is decreased.

Method 4: In another aspect, a system and method can be configured such a system can select lower-bitrate video variant in I-Frames. In some embodiments, selecting, or switching to, lower-bitrate I-frame variants (which may be temporary or only during trickplay) might allow quicker download of I-Frame chunks, which works towards increasing the performance and therefore quality of trickplay. In some embodiments, increasing SkipFactor to too high a value provides undesirable results. Beyond certain values, the quality of trickplay can deteriorate undesirably with high SkipFactor. In some embodiments, application of this method might ameliorate negative effects of increased SkipFactor. Accordingly, Method 4 may be implemented alone, or in conjunction with any of Methods 1-3 to avoid increasing SkipFactor above a set threshold.

A system or method can be configured to perform one or more of Methods 1-4, individually, or in combination, and to switch between methods to present a desirable user experience under potentially changing conditions. Where more than one of Methods 1-4 is implemented, an embodiment can be configured to use a primary method initially, or by default, and to change to another method, or to progress through a series of methods selected from Methods 1-4, in any order, in response to skipped I-frames, network latency, download times, and/or changes in SkipFactor.

As one example, a system may be configured to implement Method 1 initially, with SkipFactor=0 (or any higher value that may be set). If the VideoDecoder skips an I-frame during trickplay, or an I-frame is not ready for the decoder in time according to its PTS, the VideoDecoder may notify Chunk Downloader and Method 2 may be implemented. After Method 2 has been implemented one or a set number of times, a system or method might be configured to switch to Method 3 or Method 4. For example, if Method 2 is in use, and SkipFactor is increased a set number of times or above a set limit, a system may be configured to implement Method 4 and select lower bit-rate I-frames for downloading during trickplay. Likewise, a system may be configured to switch from Method 3 to Method 4 if SkipFactor exceeds a set threshold value. Upon implementing Method 4, and selecting lower bitrate I-frame variants, SkipFactor might be reset to the threshold value or below. In some embodiments, a system may be configured to decrease SkipFactor to a value at or below the SkipFactor limit and switch to Method 1, 2, or 3 (using the lower bitrate I-frame variants) after Method 4 has been used.

As another example, a system may be configured with a setting to implement Method 2 initially, with SkipFactor=0 (or any higher value that may be set), and to switch to Method 3 and/or Method 4 if the number of times that SkipFactor is increased exceeds a set threshold. As above, in some embodiments, upon implementing Method 4, and selecting lower bitrate I-frame variants, SkipFactor might be decreased in some embodiments, and, a system may be configured to decease SkipFactor and revert to Method 1, 2 or 3, using lower bitrate I-frame variants, after Method 4 has been used.

As another example, a system may be configured to implement Method 3 initially, with SkipFactor determined based on expected chunk download times that may be inferred from the download times of recently downloaded chunks, and to switch to Method 4 if SkipFactor is increased above a set threshold. As above, in some embodiments, upon implementing Method 4, and selecting lower bitrate I-frame variants, SkipFactor might be decreased in some embodiments, and, a system may be configured to decease SkipFactor and revert to Method 1, 2 or 3, using lower bitrate I-frame variants, after Method 4 has been used.

As another example, a system may be configured to implement Method 4 initially, selecting lower bitrate I-frame variants for download during trickplay, and then to use one of Methods 1-3, and optionally further repeating use of Method 4 if the number of times that SkipFactor is increased exceeds a set threshold.

In some embodiments, a selection may be made by a user that determines a configuration of an initial method and initial parameters, and optionally defines a progression of methods to be used in response to skipped I-frames, network latency, download times, and/or changes in SkipFactor. In some embodiments the selection may be indicated by a simple designation, such as of a "level". As one example, the foregoing example configurations may be designated as Level 1, 2, 3, 4, etc. settings (or any other designator), which may relate to a configuration, but may not attempt to explain technical aspects of the system. As can be appreciated, a system can be configured such that any number of levels can be configured to implement one or more of Methods 1-4 with different parameters.

In some embodiments, it was observed that the ideal hold time to target was between 125 milliseconds and 250 milliseconds translating to between 4 and 8 I-frames per second. Faster frame rates than this may not add to user perception of smooth trickplay quality whereas hold times below this range may be perceived as "choppy" during higher-speed trickplay.

Electronic Device

Figure 2:
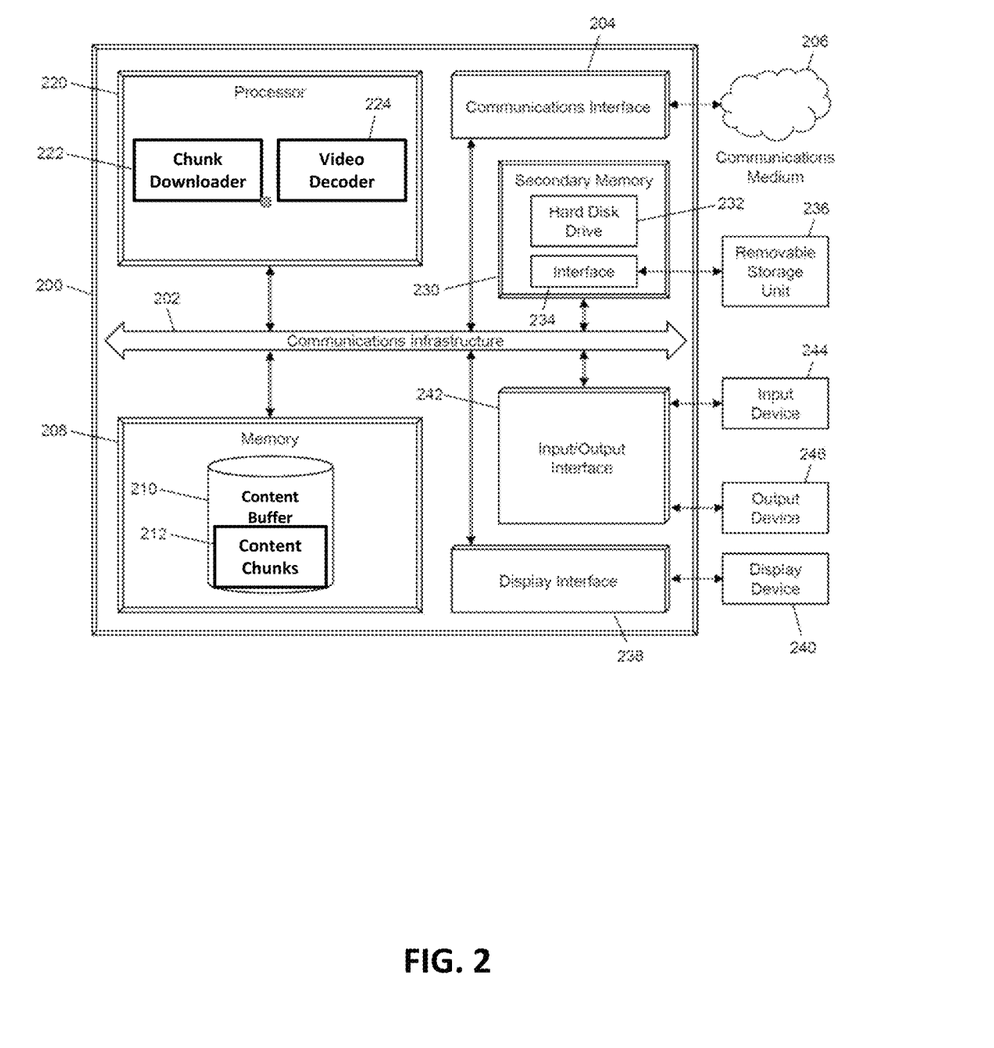
FIG. 2 is an exemplary hardware structure for an embodiment of a communication device for presentation of audiovisual (A/V) content with smooth trickplay operations.

FIG. 2 illustrates an exemplary hardware structure for an embodiment of a computer system 200 for presentation of audiovisual (A/V) content with smooth trickplay operations in accordance with exemplary embodiments. It will be apparent to persons having skill in the relevant art that the embodiment of the computer system 200 can be the electronic device 102, the display device 104, and/or the input device 110, or an integrated combination of these devices (e.g., an electronic device 102 with an integrated input device 110, or an display device 104 with the electronic device 102 built-in). Thus, the structure as illustrated in FIG. 2 is provided as illustration only and may not be exhaustive to all possible configurations of the computer system 200 suitable for performing the functions as discussed herein.

The computer system 200 may include a communications infrastructure 202. The communications infrastructure 202 may be configured to transmit data between modules, engines, databases, memories, and other components of the computer system 200 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the computer system 200 and external components of the computer system 200, such as externally connected databases, display devices, input devices, etc.

The computer system 200 may also include a communications interface 204. The communications interface 204 may include one or more interfaces used to interact with and facilitate communications between the computer system 200 and one or more external devices via suitable communications mediums 206. For instance, the communications interface 204 may interface with the communications infrastructure 202 and provide an interface 204 for connecting the computer system 200 to one or more communications mediums 206 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, cable television networks, satellite television networks, the Internet, radio frequency, Bluetooth, near field communication, etc.

In some instances, the computer system 200 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded on the parsing module. For example, the communications interface 204 may include (e.g., or otherwise have access to, such as via the communications infrastructure 202) a parser program configured to receive and transform the received data signal into usable input for the functions performed by the processing device to carry out the methods and systems described herein.

The communications interface 204 may be configured to receive data signals electronically transmitted through a communications medium 106, such as from an Internet service provider, cable television provider, satellite television provider, etc., which may be superimposed or otherwise encoded with source signals that are comprised of video and closed captioning signals. In some instances, a source signal may include a plurality of closed captioning signals, such as closed captioning signals for each of a plurality of different languages, and may also include one or more audio signals.

The computer system 200 may also include a memory 208. The memory 208 may be configured to store data for use by the computer system 200 in perform the functions discussed herein. The memory 208 may be comprised of one or more types of memory using one or more suitable types of memory storage, such as random access memory, read-only memory, hard disk drives, solid state drives, magnetic tape storage, etc. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the computer system 200 may include a content buffer 210. The content buffer 210 may be configured to store a plurality of content chunks 212 using a suitable storage format and schema. Each content entry 212 may be a content chunks entry associated with a SeqNum, PTS, and/or other data. Each content chunk entry 212 may be a video file, or other suitable file format. In some embodiments, the content chunks 212 may be stored in the content chunks 210 using a first in, first out methodology, such that, when the content buffer 210 is at capacity, each time a new content chunk 212 is inserted into the content buffer 210, the earliest added content chunk 212 currently in the content buffer 210 is removed. Capacity of the content buffer 210 may be determined by the number of content chunks 212, file size of the content chunks 212, and/or a total portion of time of the video signal associated with each of the content chunks 212, etc.

The computer system 200 may also include a processor 220. The processor 220 may be configured to perform the functions of the computer system 200 discussed herein as will be apparent to persons having skill in the relevant art. In some embodiments, the processor 220 may include and/or be comprised of a plurality of engines and/or modules specially configured to perform one or more functions of the processing device, such as a Chunk Downloader 222, Video Decoder 224, etc. As used herein, the term "module" may refer to software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores". Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The Chunk Downloader module 222 may be configured to manage the download of chunks of A/V content data, for example, video content chunks and associated data, e.g., a SeqNum, PTS and/or other data for each chunk, e.g., video content formatted into a series of I-frames. The Chunk Downloader module 222 may receive one or content chunks and/or data, may identify information stored therein. The Chunk Downloader module 222 may then output the downloaded data to an appropriate engine or module of the computer system 200, e.g., it may communicate with the Video Decoder and/or the content buffer as necessary. The Chunk Downloader module 222 may, for example, execute downloads of A/V content chunks and transfer the chunks to a buffer, for access by another module such as the Video Decoder 224 for display of the A/V content on the display device 240. The Chunk Downloader module 222 may also receive data and commands from other modules relating to the performance of its function, for example, commands to begin or end operations following the receipt of user instructions through an input device 244, the SeqNum and/or PTS of the currently displayed chunk, the current hold time, for a chunk, etc.

The Video Decoder module 224 may be configured to manage the display of A/V content on the display device 240 in accordance with the functions discussed herein. For example, the Video Decoder module 224 may be configured to activate or deactivate the display of A/V content on the display device, manage the display of active A/V content, replace active content with new display content (e.g., sequential chunks of A/V content) on the display device 240, etc. The Video Decoder module 224 may be configured to communicate with other modules to transmit and receive data and commands, e.g., the PTS of the current chunk, the average or current hold time, etc.

In embodiments, processor 220, or one or more modules thereof, may manage and control the communication and operations of the Chunk Downloader and Video Decoder to carry out one or more of the trickplay methods described herein, for example by commanding Chunk Downloader to use a specified SkipFactor in response to user selectable settings and/or data communicated by Video Decoder. In other embodiments, the Chunk Downloader may be configured to access user selectable settings in memory or other storage and/or data communicated by Video Decoder (e.g., the number of chunks that have been skipped, the PTS of the currently displayed chunk, and/or the hold time) and then determine a SkipFactor to be used in downloading chunks of A/V content (e.g., I-frames) in accordance with one or more of the methods described herein.

In some embodiments, the computer system 200 may also include a secondary memory 230. The secondary memory 230 may be another memory in addition to the memory 208 that may be used to store additional data for use in performing the functions of the computer system 200 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some cases, the computer system 200 may also include a display interface 238. The display interface may be configured to interface the computer system 200 with one or more display devices 240, such as the display device 104. The display devices 240 may be devices configured to display data received from the computer system 200. Display devices 240 may be any suitable type of display, including, for example, liquid crystal displays, light emitting diode displays, thin film transistor display, capacitive touch displays, etc. In some instances, the computer system 200 may include one or more display interfaces 238, which may interface with one or more display devices 240. Display devices 240 may be video display or integrated A/V devices. For example, display devices may display the video signal received by the computer system 200 together with presenting corresponding audio, e.g., through built-in speakers, or may display video alone, e.g., where corresponding audio is presented though a separate output device 246.

The computer system 200 may also include an input/output interface 242. The input/output interface 242 may be configured to interface the computer system 200 with one or more input devices 244 and/or output devices 246 for the transmission to and receipt from the respective input and output devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to a computer system 200, such as a keyboard, mouse, microphone, camera, touch screen, click wheel, scroll wheel, remote control, etc. Input devices 244 may be configured to receive input from a user of the computer system 200, such as the user 108, which may include an instruction to fast-forward or rewind A/V content, e.g., to navigate forward and backward through A/V content. Output devices may perform a wide variety of functions and may include status displays, audio systems (e.g. amplifiers and/or speakers), control interfaces associated with input devices, etc. Output devices 246 may include any suitable type of device for outputting data from a computer system 200, such as a speaker, remote control, headset, tactile feedback device, etc.

Exemplary Methods

Figure 3:
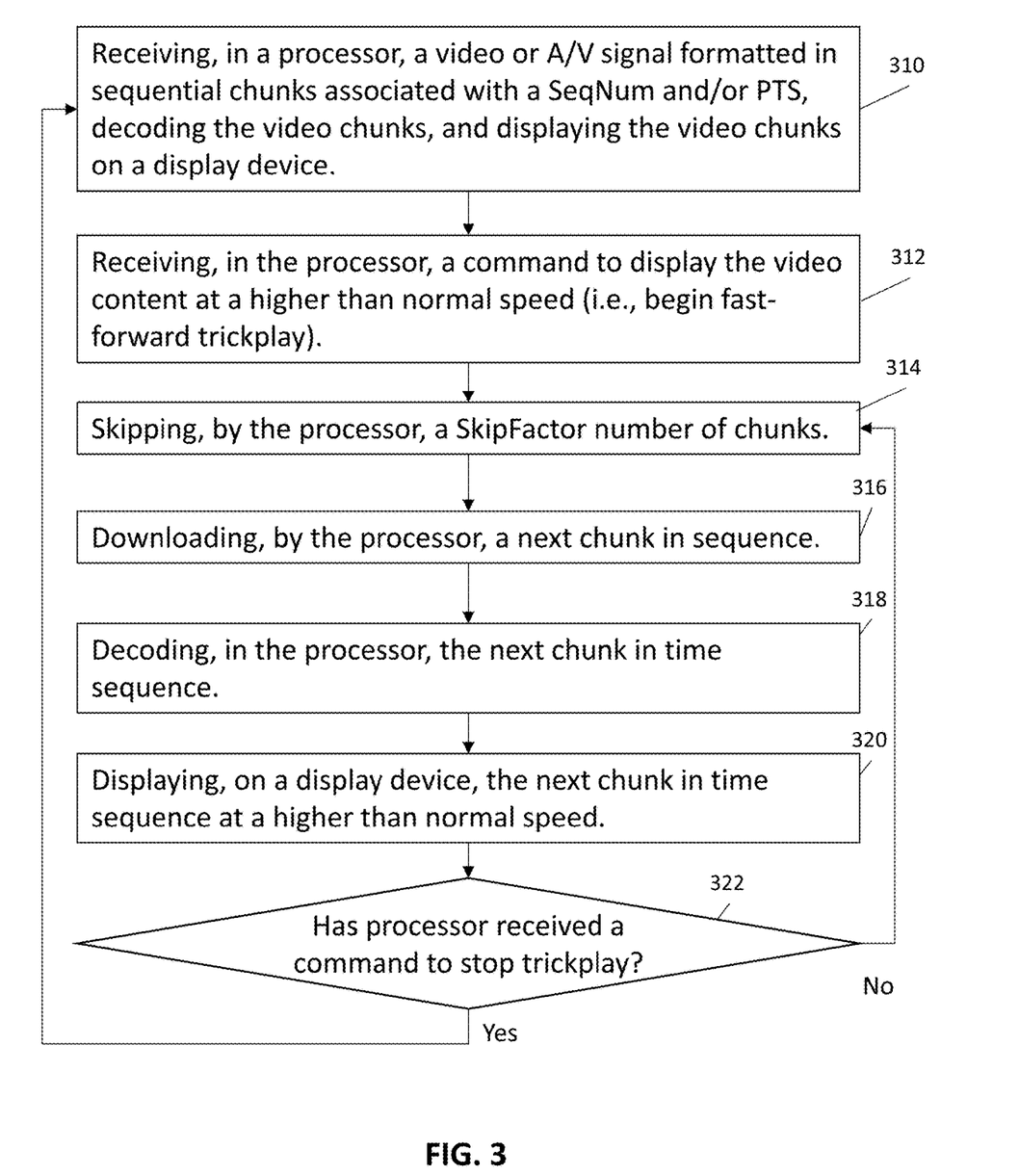
FIGS. 3-6 illustrate methods for controlling downloading of audiovisual (A/V) content with smooth trickplay operations.

FIG. 3 is an illustration of a method for controlling downloading of audiovisual content during trickplay operations. As shown in FIG. 3, the user or consumer can be watching video content on the display device 104 (e.g., HTTP Live Streaming (HLS) or Dynamic Adaptive Streaming over HTTP (DASH)). The content could be from any source including, for example, streaming or recorded live television (TV), as well as recorded content received via Cable, Satellite, Terrestrial, IP, and/or over-the-top (OTT) content, such as HLS or DASH having LOD (Live of Disc) capability, wherein a rewind and/or fast-forward feature is supported. A video or A/V signal formatted in sequential chunks that are each associated with a SeqNum and/or PTS are received, at step 310, in a processor. The processor decodes the video chunks, and the video chunks are displayed on a display device.

When the user wishes to change to a different time position in the content, the user can give command on the input device 110, for example, by pressing a pre-defined key or keys on the input device 110 to initiate trickplay. In accordance with an aspect, upon the initiation of trickplay, the display screen can include the current video chunk, which is then followed by earlier or later video chunks at a preset or user selectable speed. In accordance with an embodiment, the one or more previous or later video chunks can be displayed for a hold time before being replaced by another previous or later video chunk in sequence, depending on whether the operation is a fast-forward or reverse (rewind) operation. In accordance with an embodiment, the hold time can be set to be a fraction of the normal display time of the chunk to provide a multiple-based, for example, 2×, 4×, 8×, 16×, speed of trickplay of content, either forward or reverse. In accordance with an exemplary embodiment, display of time-based video frames and/or scene-based videos frames can include an index, for example, a corresponding timestamp.

The command to display the content using trickplay is received, at step 312, in the processor. Upon initiation of the trickplay operation, the Chunk Downloader of the processor obtains a SkipFactor, for example, from a setting stored in memory, and skips, at step 314, a SkipFactor Number of chunks. The Chunk Downloader in the processor downloads, at step 316, the chunk that follows the chunk that is next in sequence after the skipped chunk(s). In some embodiments, the Chunk Downloader communicates the downloaded chunk to the Video Decoder or stores the downloaded chunk in a content buffer. The Video Decoder of the processor can retrieve the downloaded chunk from a content buffer, and decode, at step 318, the chunk when the PTS of the downloaded chunk is current. The decoded chunk is displayed, at step 320, while the Chunk Downloader downloads a new chunk, skipping SkipFactor chunks between each downloaded chunk. Trickplay continues in this fashion until a command is received in the processor to stop trickplay, at step 322.

Figure 4:
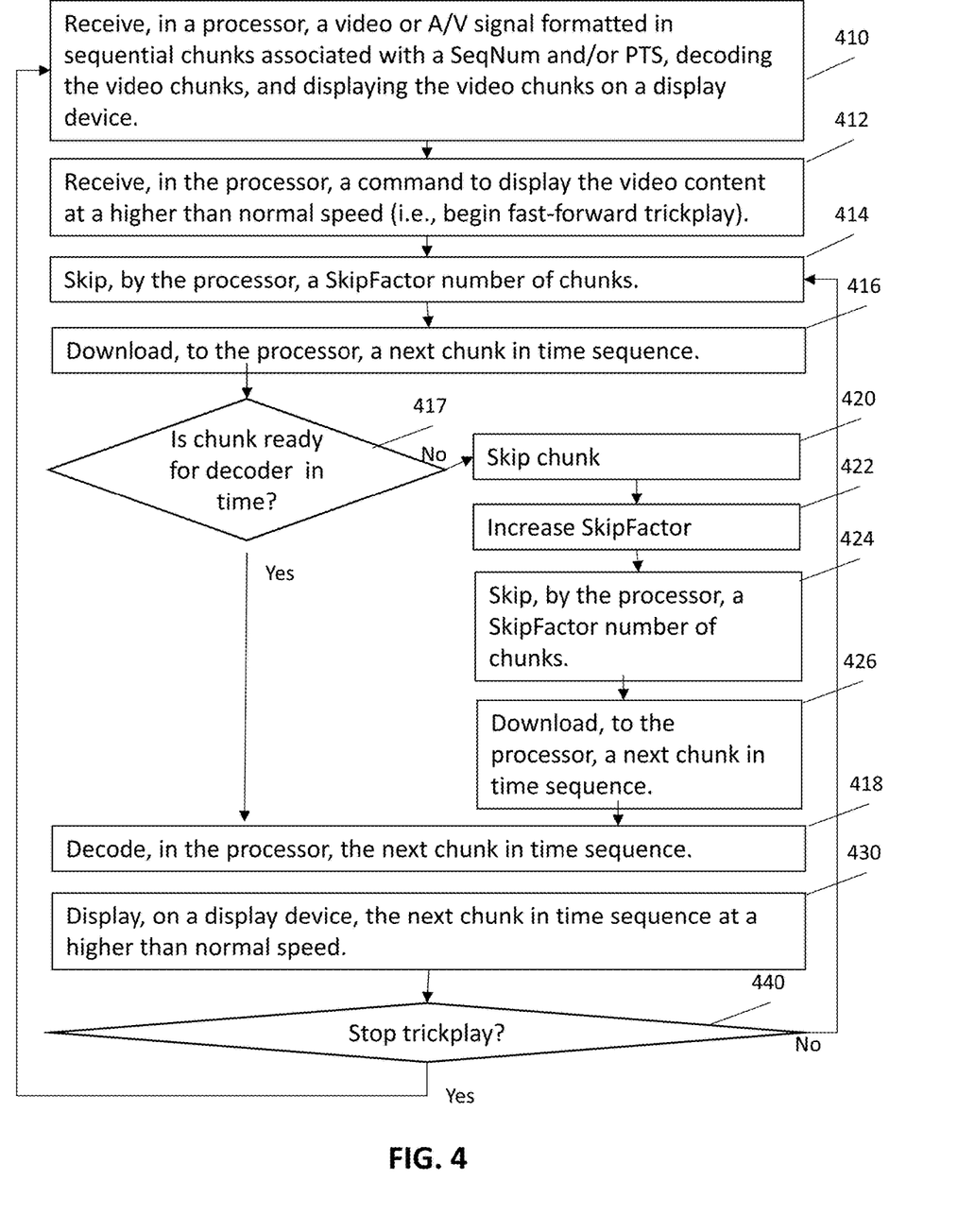

FIG. 4 is an illustration of another method for controlling downloading of audiovisual content during trickplay operations. As above, the user or consumer can be watching video content on the display device 104 (e.g., HTTP Live Streaming (HLS) or Dynamic Adaptive Streaming over HTTP (DASH)). A video or A/V signal formatted in sequential chunks that are each associated with a SeqNum and/or PTS are received, at step 410, in a processor. The processor decodes the video chunks, and the video chunks are displayed on a display device.

When the user wishes to change to a different time position in the content, the user can give command on the input device 110, for example, by pressing a pre-defined key or keys on the input device 110 to initiate trickplay. As above, in accordance with an embodiment, the display speed can be set to a multiple-based, for example, 2×, 4×, 8×, 16×, speed of trickplay of content, either forward or reverse, and the hold time can be set to be a fraction of the normal display time of a chunk in accordance with the display speed. In accordance with an exemplary embodiment, display of time-based video frames and/or scene-based videos frames can include an index, for example, a corresponding timestamp.

The command to display the content using trickplay is received, at step 412, in the processor. Upon initiation of the trickplay operation, the Chunk Downloader of the processor obtains a SkipFactor, for example from a setting stored in memory, and skips, at step 414, a SkipFactor Number of chunks. The initial SkipFactor can be zero or a higher number that can based on experience. The Chunk Downloader in the processor downloads, at step 416, the chunk that is next in sequence after the skipped chunk(s). In some embodiments, the Chunk Downloader communicates the downloaded chunk to the Video Decoder or stores the downloaded chunk in a content buffer. The Video Decoder of the processor can retrieve the downloaded chunk from a content buffer, and decode, at step 418, the chunk when, at step 417, the PTS of the downloaded chunk is current. In some embodiments, if the downloaded chunk is not ready for the Video Decoder at the time that it should be displayed, at step 417, (e.g., the PTS is not current), then the chunk may be skipped, at step 420, by the Video Decoder. When this happens, the SkipFactor is increased, at step 422, so that a greater number of chunks are skipped, at step 424, before downloading, at step 426, the next chunk in sequence to be decoded, at step 426. In an alternate embodiment, the Video Decoder can be configured to not skip the late chunk (it may be decoded and displayed), and the SkipFactor is increased so that a greater number of chunks are skipped before downloading the next chunk to be decoded.

The decoded chunk is displayed, at step 430, while the Chunk Downloader downloads a new chunk, skipping SkipFactor chunks between each downloaded chunk. Trickplay continues in this fashion until a command is received in the processor to stop trickplay, at step 440.

Figure 5:
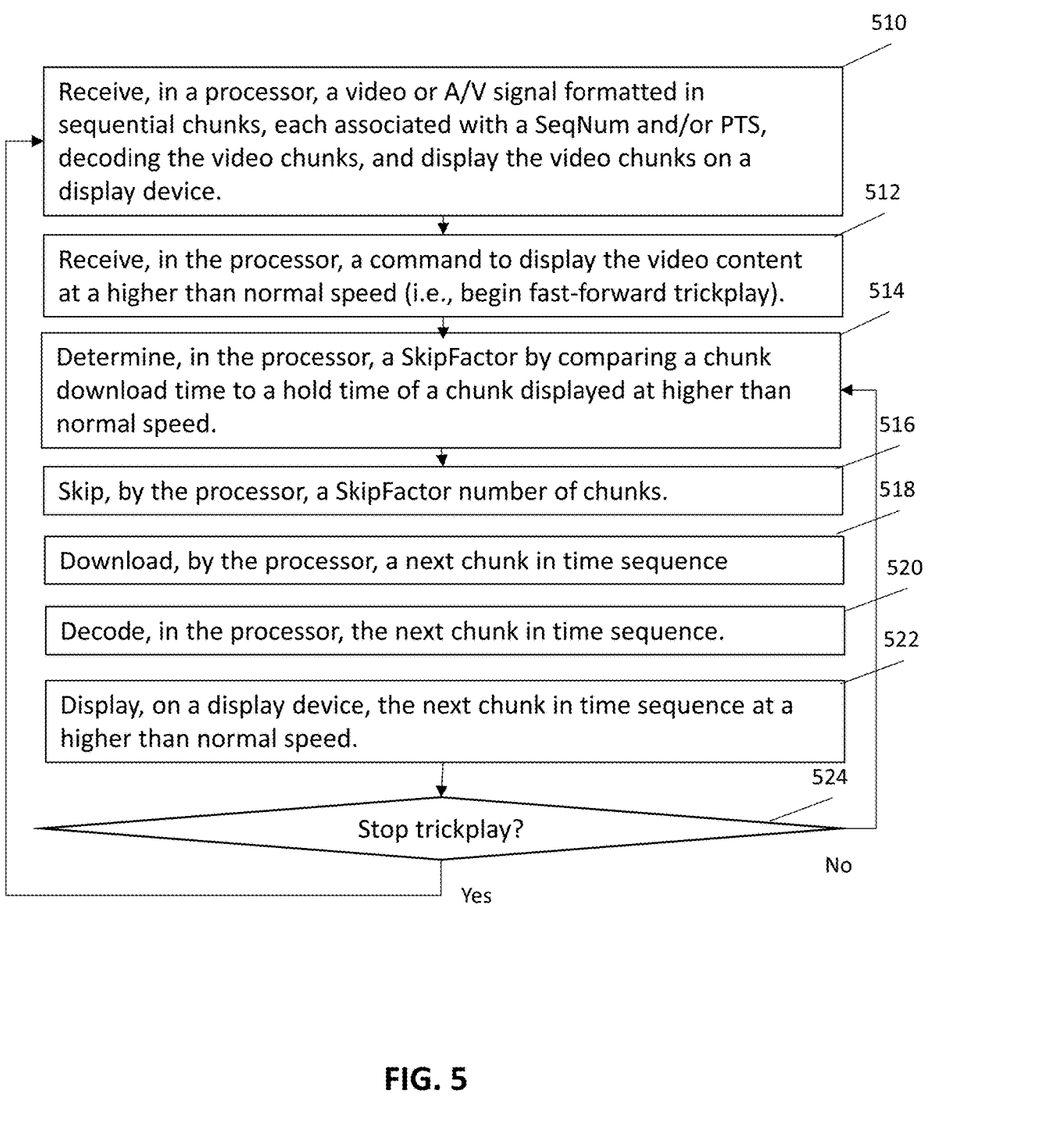

FIG. 5 is an illustration of another method for controlling downloading of audiovisual content during trickplay operations. As above, the user or consumer can be watching video content on the display device 104 (e.g., HTTP Live Streaming (HLS) or Dynamic Adaptive Streaming over HTTP (DASH)). A video or A/V signal formatted in sequential chunks that are each associated with a SeqNum and/or PTS are received, at step 510, in a processor. The processor decodes the video chunks, and the video chunks are displayed on a display device.

When the user wishes to change to a different time position in the content, the user can give command on the input device 110 to initiate trickplay. As above, in accordance with an embodiment, the display speed can be set to a multiple-based, for example, 2×, 4×, 8×, 16×, speed of trickplay of content, either forward or reverse, and the hold time can be set to be a fraction of the normal display time of a chunk in accordance with the display speed.

The command to display the content using trickplay is received, at step 512, in the processor. Upon initiation of the trickplay operation, the Chunk Downloader of the processor determines a SkipFactor 514 by comparing the hold time of a current chunk displayed at the specified trickplay speed to a download time of a chunk (e.g., an expected download time). The new hold time can be calculated by dividing the normal hold time by the speed multiple of the trickplay. The expected download time used in the comparison can be a recent download time (e.g., the download time of the last chunk to be downloaded) or may be an average (e.g., a rolling average of the download times of the last n chunks to be downloaded, where n=1, 2, 3, 4, 5, etc.). Download times of one or more recently downloaded chunks (or a rolling average download time) can be stored in memory by the Chunk Downloader and retrieved for this comparison. Alternatively, an expected download time can be calculated in any other way, for example based on network status information obtained from a network interface in communication with the processor. If the expected download time of the next chunk is longer than the new hold time, then that chunk would not be available when needed to maintain trickplay speed and SkipFactor is increased such that at the end of an expected chunk download time, a chunk having a PTS consistent with the desired trickplay speed is expected to be available. In another embodiment, the SkipFactor can be incremented such that the difference in PTS between chunks that are not skipped and are downloaded with an expected chunk download time (optionally plus a set margin) will be equal to the new hold time multiplied by the trickplay speed multiple.

The Chunk Downloader of the processor skips, at step 516, the SkipFactor number of chunks before downloading 518 the chunk that is next in sequence after the skipped chunk(s). In some embodiments, the Chunk Downloader communicates the downloaded chunk to the Video Decoder or stores the downloaded chunk in a content buffer. The Video Decoder of the processor can retrieve the downloaded chunk from a content buffer, and decode, at step 520, the chunk.

The decoded chunk is displayed, at step 522, while the Chunk Downloader downloads a new chunk, determining a new SkipFactor, at step 514, as above. Trickplay continues in this fashion until a command is received in the processor to stop trickplay, at step 524.

Figure 6:
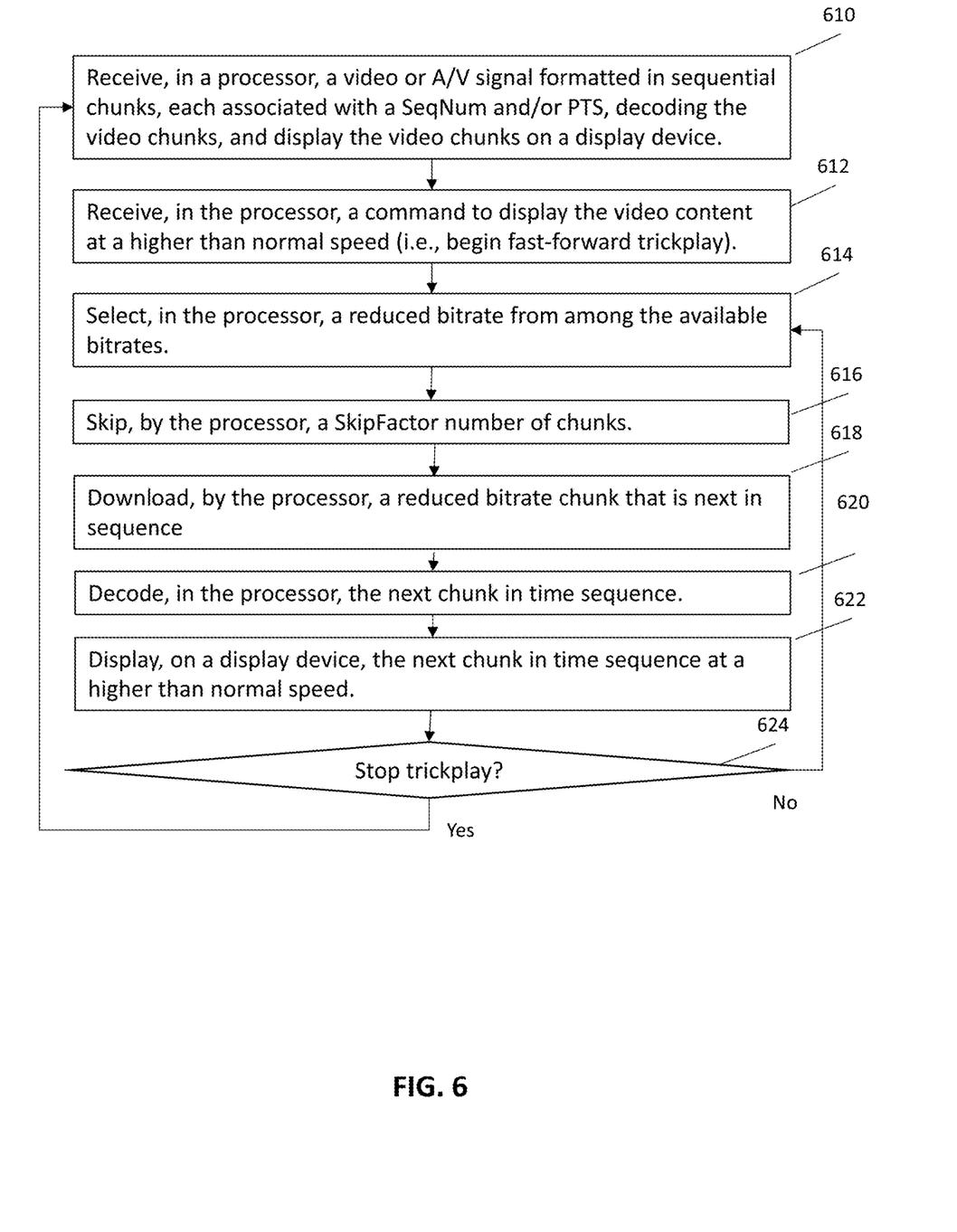

FIG. 6 is an illustration of another method for controlling downloading of audiovisual content during trickplay operations. As above, the user or consumer can be watching video content on the display device 104. The processor receives, at step 610, a video or A/V signal that is formatted in chunks, decodes the video chunks, and the video chunks are displayed on a display device.

When a command to display the content using trickplay is received, at step 612, in the processor, the Chunk Downloader of the processor selects, at step 614, a reduced bitrate from among the available bitrates of the chunks. The Chunk Downloader of the processor skips, at step 616, a SkipFactor number of chunks before downloading, at step 618, the reduced bitrate chunk that is next in sequence after the skipped chunk(s). The SkipFactor may be a preset value, or may be determined based on expected download times of chunks at the reduced bitrate. The Video Decoder of the processor decodes, at step 620, the chunk, which is displayed, at step 622, while the Chunk Downloader downloads a new chunk. Trickplay can continue in this fashion until a command is received in the processor to stop trickplay, at step 624.

Figure 7:
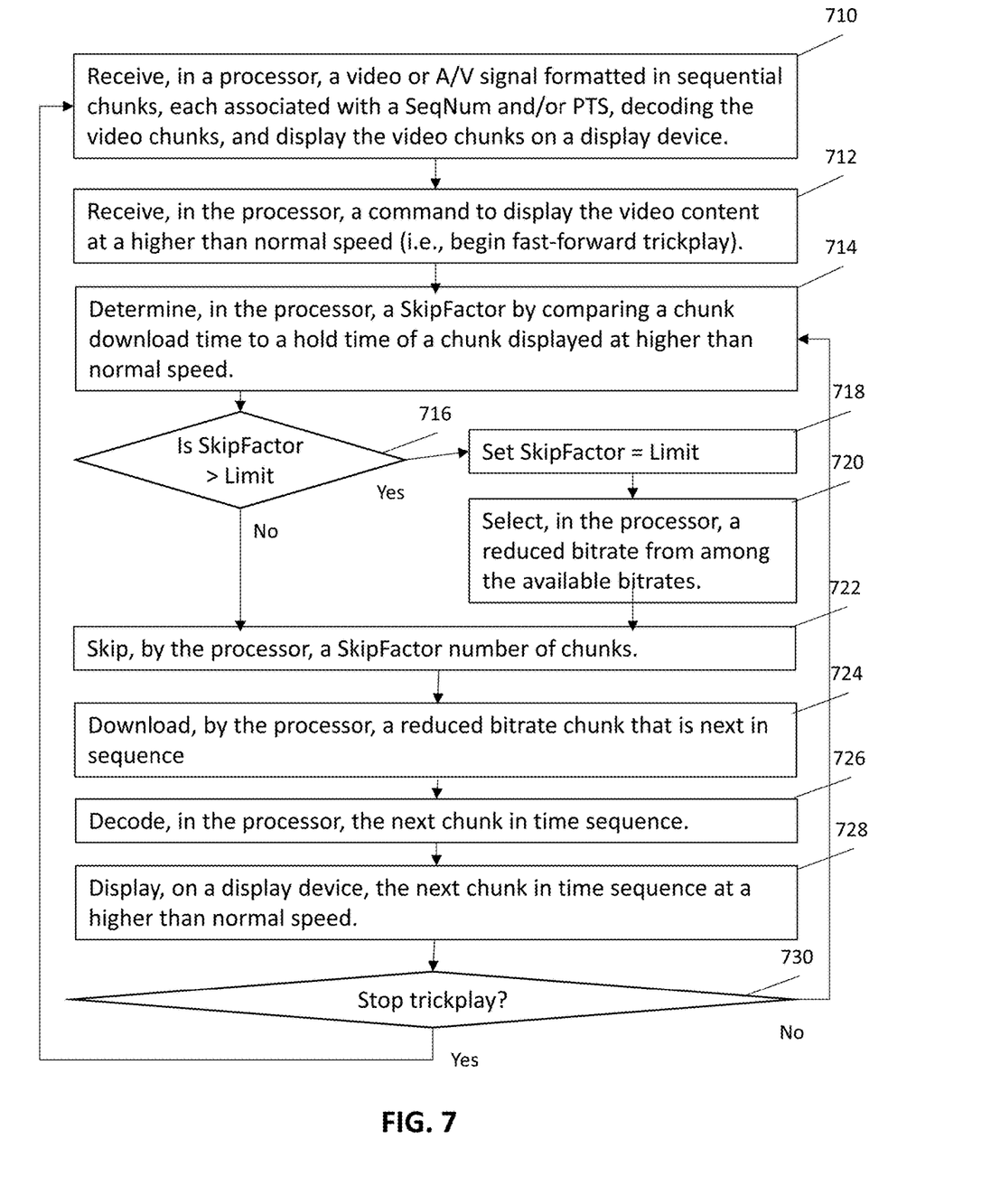
FIG. 7 is a flow chart illustrating an exemplary combination method for presentation of audiovisual content with smooth trickplay operations.

FIG. 7 is an illustration of how the foregoing methods may be combined. A person of ordinary skill in the art will recognize that this is only one possible combination and that other combinations are possible. In this example, as above, the processor receives, at step 710, a video or A/V signal that is formatted in chunks, decodes the video chunks, and the video chunks are displayed on a display device. When a command to display the content using trickplay is received, at step 712, in the processor, the processor determines a SkipFactor, at step 714. The SkipFactor can be determined, for example as discussed above with regard to FIG. 5.

If the determined SkipFactor exceeds a preset limit, at step 716, then SkipFactor is set to that limit, at step 718, and the processor selects, at step 720 a reduced bitrate from among the available bitrates of the chunks as described above in regard to FIG. 6.

The Chunk Downloader of the processor skips, at step 722, the SkipFactor number of chunks before downloading, at step 724, the chunk that is next in sequence after the skipped chunk(s). The Video Decoder of the processor decodes, at step 726, the chunk, which is displayed, at step 728, while the Chunk Downloader downloads a new chunk by repeating the steps above. Trickplay can continue in this fashion until a command is received in the processor to stop trickplay, at step 730.

While the disclosure has been described in detail with reference to preferred embodiments thereof, it will be apparent to one skilled in the art that various changes can be made, and equivalents employed, without departing from the spirit and scope of the disclosure.

What is claimed is:

1. A method for displaying video or audiovisual data at an increased speed, the method comprising:
   a) receiving, in a processor, data comprising a video or audiovisual signal formatted in a sequence of chunks, each chunk associated with a sequence number and/or presentation time stamp, wherein the chunks are downloaded sequentially over a communications medium by the processor in communication with a communications interface;
   b) receiving, in the processor, a command to display the data at a trickplay speed that is higher than normal speed;
   c) skipping, by the processor, a SkipFactor number of skipped chunks that are next in the sequence, wherein the skipping includes:
      c.1) determining, in the processor, the SkipFactor by comparing the duration of display of a chunk at the trickplay speed to an expected download time;

wherein if the expected download time exceeds the duration of display of a chunk at the trickplay speed, then setting, by the processor, the value of the SkipFactor such that when a next sequential downloaded chunk is expected to be downloaded and available to the processor for decoding, that next chunk will have a presentation time stamp at least equal to a progression of time at the trickplay speed; and c.2) skipping, by the processor, a SkipFactor number of skipped chunks that are next in the sequence;

d) downloading, by the processor, a next chunk in the sequence of chunks following the skipped chunks;

e) decoding, by the processor, the downloaded chunk;

f) displaying, on a display device, the decoded chunk at the trickplay speed; and g) repeating, by the processor, steps c)-f) until receiving, in the processor, a command to stop displaying the data at a trickplay speed.

2. The method of claim 1, further comprising:

d.1) determining, in the processor, if the downloaded chunk is ready for decoding by the time that its presentation time stamp corresponds to the current time at the trickplay speed; and d.2) if the downloaded chunk is not ready for decoding by the time that its presentation time stamp corresponds to the current time at the trickplay speed, then increasing, by the processor, the value of the SkipFactor.

3. The method of claim 1, further comprising:

selecting, in the processor, reduced bitrate chunks for downloading while the data is displayed at a trickplay speed that is higher than normal speed.

4. The method of claim 2, further comprising:

if SkipFactor is increased above a preselected threshold, then resetting, in the processor, SkipFactor to a value at or below the preselected threshold, and selecting, in the processor, reduced bitrate chunks for downloading while the data is displayed at a trickplay speed that is higher than normal speed.

5. The method of claim 1, further comprising:

if SkipFactor is increased above a preselected threshold, then resetting, in the processor, SkipFactor to a value at or below the preselected threshold, and selecting, in the processor, reduced bitrate chunks for downloading while the data is displayed at a trickplay speed that is higher than normal speed.

6. A media control device comprising:

a processor configured to receive data downloaded through a communications interface over a communications medium by a processor in communication with the communications interface, wherein the data comprises a video or audiovisual signal formatted in a sequence of chunks, each chunk associated with a sequence number and/or presentation time stamp, and wherein the chunks are downloaded sequentially into the processor;

an input/output interface configured to receive a command from an input device to display the data at a trickplay speed that is higher than normal speed and to communicate commands to the processor;

a display interface in communication with the processor and configured to output a video signal from the processor to a display device, wherein the processor is further configured to, after receiving a command from an input device to display the data at a trickplay speed that is higher than normal speed:

a) skip a SkipFactor number of skipped chunks that are next in the sequence, wherein skipping the SkipFactor number of skipped chunks includes:

a.1) determining, in the processor, the SkipFactor by comparing the duration of display of a chunk at the trickplay speed to an expected download time; wherein if the expected download time exceeds the duration of display of a chunk at the trickplay speed, then setting, by the processor, the value of the SkipFactor such that when a next sequential downloaded chunk is expected to be downloaded and available to the processor for decoding, that next chunk will have a presentation time stamp at least equal to a progression of time at the trickplay speed; and a.2) skipping, by the processor, a SkipFactor number of skipped chunks that are next in the sequence;

b) download a next chunk in the sequence of chunks following the skipped chunks;

c) decode the downloaded chunk;

d) output the decoded chunk through the display interface at the trickplay speed; and e) repeat functions a)-d) until receiving a command to stop displaying the data at a trickplay speed.

7. The media control device of claim 6, wherein the processor is further configured to increase the value of the SkipFactor if a downloaded chunk is not ready for decoding by the time that its presentation time stamp corresponds to the current time at the trickplay speed.

8. The media control device of claim 6, wherein the processor is further configured to select reduced bitrate chunks for downloading while the data is displayed at a trickplay speed that is higher than normal speed.

9. The media control device of claim 7, wherein the processor is further configured to, if SkipFactor is increased above a preselected threshold, then reset SkipFactor to a value at or below the preselected threshold, and select reduced bitrate chunks for downloading while the data is displayed at a trickplay speed that is higher than normal speed.

10. The media control device of claim 1, wherein the processor is further configured to, if SkipFactor is increased above a preselected threshold, then reset SkipFactor to a value at or below the preselected threshold, and select reduced bitrate chunks for downloading while the data is displayed at a trickplay speed that is higher than normal speed.

11. A non-transitory computer readable medium having instructions operable to cause one or more processors to perform operations comprising:

a) receiving, in a processor, data comprising a video or audiovisual signal formatted in a sequence of chunks, each chunk associated with a sequence number and/or presentation time stamp, wherein the chunks are downloaded sequentially over a communications medium by the processor in communication with a communications interface;

b) receiving, in the processor, a command to display the data at a trickplay speed that is higher than normal speed;

c) skipping, by the processor, a SkipFactor number of skipped chunks that are next in the sequence, wherein the skipping includes:

c.1) determining, in the processor, the SkipFactor by comparing the duration of display of a chunk at the trickplay speed to an expected download time; wherein if the expected download time exceeds the duration of display of a chunk at the trickplay speed, then setting, by the processor, the value of the SkipFactor such that when a next sequential downloaded chunk is expected to be downloaded and available to the processor for decoding, that next chunk will have a presentation time stamp at least equal to a progression of time at the trickplay speed; and c.2) skipping, by the processor, a SkipFactor number of skipped chunks that are next in the sequence;

d) downloading, by the processor, a next chunk in the sequence of chunks following the skipped chunks;

e) decoding, by the processor, the downloaded chunk;

f) displaying, on a display device, the decoded chunk at the trickplay speed; and g) repeating, by the processor, steps c)-f) until receiving, in the processor, a command to stop displaying the data at a trickplay speed.

12. The non-transitory computer readable medium of claim 11, having instructions operable to cause one or more processors to perform operations further comprising:

d.1) determining, in the processor, if the downloaded chunk is ready for decoding by the time that its presentation time stamp corresponds to the current time at the trickplay speed; and d.2) if the downloaded chunk is not ready for decoding by the time that its presentation time stamp corresponds to the current time at the trickplay speed, then increasing, by the processor, the value of the SkipFactor.

13. The non-transitory computer readable medium of claim 11, having instructions operable to cause one or more processors to perform operations further comprising:
selecting, in the processor, reduced bitrate chunks for downloading while the data is displayed at a trickplay speed that is higher than normal speed.

14. The non-transitory computer readable medium of claim 12, having instructions operable to cause one or more processors to perform operations further comprising:
if SkipFactor is increased above a preselected threshold, then resetting, in the processor, SkipFactor to a value at or below the preselected threshold, and selecting, in the processor, reduced bitrate chunks for downloading while the data is displayed at a trickplay speed that is higher than normal speed.

15. The non-transitory computer readable medium of claim 11, having instructions operable to cause one or more processors to perform operations further comprising:
if SkipFactor is increased above a preselected threshold, then resetting, in the processor, SkipFactor to a value at or below the preselected threshold, and selecting, in the processor, reduced bitrate chunks for downloading while the data is displayed at a trickplay speed that is higher than normal speed.

* * * * *